US011817737B2

(12) United States Patent
Madonna et al.

(10) Patent No.: US 11,817,737 B2
(45) Date of Patent: *Nov. 14, 2023

(54) FLEXIBLE LOAD MANAGEMENT SYSTEM

(71) Applicant: Savant Systems, Inc., Hyannis, MA (US)

(72) Inventors: Robert P. Madonna, Osterville, MA (US); William H. Dillon, Corvallis, OR (US); Daniel H. Chapman, Brooklyn, NY (US); Anna E. Demeo, Southwest Harbor, ME (US); Alex Wiggins, Portland, OR (US); Nicole Madonna, San Francisco, CA (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,838

(22) Filed: Aug. 22, 2022

(65) Prior Publication Data

US 2022/0399744 A1    Dec. 15, 2022

Related U.S. Application Data

(63) Continuation of application No. 17/343,122, filed on Jun. 9, 2021, now Pat. No. 11,424,641.

(51) Int. Cl.
*H02J 9/00*  (2006.01)
*H02J 3/00*  (2006.01)
*H02J 7/00*  (2006.01)

(52) U.S. Cl.
CPC ............. *H02J 9/002* (2013.01); *H02J 3/007* (2020.01); *H02J 7/0048* (2020.01); *H02J 2310/12* (2020.01)

(58) Field of Classification Search
CPC ........ H02J 9/002; H02J 3/007; H02J 2310/12; H02J 13/00036; H02J 13/00;
(Continued)

(56) References Cited

U.S. PATENT DOCUMENTS 4,001,646 A    1/1977  Howell
5,185,705 A    2/1993  Farrington
(Continued)

FOREIGN PATENT DOCUMENTS

CA          2353667 A1      2/2002
CN       102084569 A        6/2011
(Continued)

OTHER PUBLICATIONS

PCT Notification of Transmittal of the International Search Report and the Written Opinion of the International Searching Authority, or the Declaration, International Searching Authority, International Application No. PCT/US2022/032286, dated Sep. 28, 2022, 13 pages.

(Continued)

*Primary Examiner* — Lincoln D Donovan
*Assistant Examiner* — Alex W Lam
(74) *Attorney, Agent, or Firm* — Cesari and McKenna, LLP (57) ABSTRACT

A flexible load management (FLM) system and technique adaptively monitors and manages power consumption of a premises. The FLM system includes a virtual critical load panel (vCLP) that utilizes circuit breakers in combination with companion modules (i.e., intelligent controllers) to vary a prioritization arrangement of loads in the premises by time of day, season or even dynamically. The vCLP is a prioritized enumeration (i.e., prioritization) of the loads within the premises, wherein the loads are considered sufficiently important such that they are protected by a local (Continued)

power source. The vCLP is dynamically configurable by a user in real time according to an instantaneous demand for the prioritized loads that is used to determine a number of branch circuits associated with the loads that is able to be powered-on at any time.

20 Claims, 5 Drawing Sheets

(58) Field of Classification Search
CPC .......... H02J 13/00002; H02J 13/00004; H02J 3/0073; H02J 3/06; H02J 1/001
See application file for complete search history.

(56) References Cited

U.S. PATENT DOCUMENTS

| | | | |
|---|---|---|---|
| 7,043,380 | B2 | 5/2006 | Rodenberg, III |
| 9,105,180 | B2 | 8/2015 | McKinley et al. |
| 10,042,336 | B2 | 8/2018 | Cipollo et al. |
| 2004/0007534 | A1 | 1/2004 | Liao et al. |
| 2005/0102544 | A1* | 5/2005 | Brewer ................ G06F 1/3203 713/320 |
| 2005/0216131 | A1 | 9/2005 | Sodemann et al. |
| 2007/0222295 | A1 | 9/2007 | Wareham et al. |
| 2010/0152910 | A1 | 6/2010 | Taft |
| 2010/0161146 | A1 | 6/2010 | Boss et al. |
| 2010/0314940 | A1 | 12/2010 | Palmer et al. |
| 2011/0210712 | A1 | 9/2011 | Tagare |
| 2011/0313587 | A1 | 12/2011 | Lin |
| 2012/0239218 | A1 | 9/2012 | Forbes, Jr. |
| 2012/0324271 | A1 | 12/2012 | Nigam et al. |
| 2014/0067144 | A1 | 3/2014 | Chen et al. |
| 2014/0088780 | A1 | 3/2014 | Chen |
| 2014/0139023 | A1 | 5/2014 | Hwang et al. |
| 2014/0277800 | A1* | 9/2014 | Hughes ............... H04L 12/2816 700/287 |
| 2014/0379161 | A1 | 12/2014 | Busser |
| 2015/0012145 | A1 | 1/2015 | Kiko |
| 2015/0042286 | A1 | 2/2015 | Lu et al. |
| 2015/0214759 | A1 | 7/2015 | Wootton et al. |
| 2015/0214768 | A1 | 7/2015 | Matsuyama et al. |
| 2015/0256665 | A1 | 9/2015 | Pera et al. |
| 2015/0276253 | A1 | 10/2015 | Montalvo |
| 2015/0280436 | A1 | 10/2015 | Weckx et al. |
| 2016/0226235 | A1 | 8/2016 | Lathrop et al. |
| 2016/0350778 | A1 | 12/2016 | Levine et al. |
| 2016/0358722 | A1* | 12/2016 | Lakshmanan .......... H01H 47/22 |
| 2016/0363949 | A1 | 12/2016 | Zimmanck |
| 2017/0140602 | A1 | 5/2017 | Curt |
| 2017/0236676 | A1 | 8/2017 | Bartonek |
| 2017/0288599 | A1 | 10/2017 | Chapman et al. |
| 2018/0075548 | A1 | 3/2018 | Madonna |
| 2018/0082816 | A1* | 3/2018 | Herrmann ............. H01H 71/36 |
| 2018/0299160 | A1 | 10/2018 | Inuga et al. |
| 2018/0342870 | A1 | 11/2018 | Zeng et al. |

FOREIGN PATENT DOCUMENTS

| | | |
|---|---|---|
| CN | 204230176 U | 3/2015 |
| CN | 104537505 | 4/2015 |
| CN | 105848389 A | 8/2016 |
| JP | 2002-95152 A | 3/2002 |
| JP | 2003111311 A | 4/2003 |
| JP | 2005110218 A | 4/2005 |
| JP | 2008310972 A | 12/2008 |
| JP | 2009-507340 A | 2/2009 |
| JP | 2010-537622 A | 12/2010 |
| JP | 2011-120323 A | 6/2011 |
| JP | 201222706 A | 2/2012 |
| JP | 2012511300 A | 5/2012 |
| JP | 2012-514963 A | 6/2012 |
| JP | 2012-235615 A | 11/2012 |
| JP | 2015-215879 A | 12/2015 |
| JP | 2016-134939 A | 7/2016 |
| JP | 2016-158479 A | 9/2016 |
| KR | 1014404920000 | 9/2014 |
| WO | WO-2004023624 A1 | 3/2004 |
| WO | WO-2005065148 A2 | 7/2005 |
| WO | WO-200727063 A1 | 3/2007 |
| WO | WO-2007027063 A1 | 3/2007 |
| WO | WO-2010065197 A2 | 6/2010 |
| WO | WO-2011073020 A2 | 6/2011 |
| WO | WO-2015134987 A1 | 9/2015 |
| WO | WO-2016/036419 A1 | 3/2016 |

OTHER PUBLICATIONS

Demeo, Anna, et al. "Community smart grid utilizing dynamic demand response and tidal power for grid stabilization." *Smart Grid and Renewable Energy* 4.07 (2013): 465-472.

EP Office Action dated Jun. 7, 2021, EP Application No. 17 777 715.8-1202, 4 pages.

Husen et al. "Lighting Systems Control for Demand Response," IEEE 2011, 6 pages.

Kempton, Willett et al. "Vehicle-to-grid power implementation: From stabilizing the grid to supporting large-scale renewable energy." *Journal of power sources* 144.1 (2005): 280-294.

Park, Sung Min. "Control and Integration Strategies for Bidirectional and Unidirectional Converters in Residential Distributed Power Systems." (2015).

PCT Notification of Transmittal of the International Search Report and the Written Opinion of the International Searching Authority, or the Declaration, International Searching Authority, International Application No. PCT/US2017/051808, dated May 14, 2018, 24 pages.

PCT Invitation to Pay Additional Fees and, Where Applicable, Protest Fee, International Application No. PCT/US2017/051808, dated Dec. 1, 2017, 14 pages.

* cited by examiner

FLEXIBLE LOAD MANAGEMENT SYSTEM

CROSS-REFERENCE TO RELATED APPLICATIONS

The present application is a continuation of U.S. patent application Ser. No. 17/343,122, entitled FLEXIBLE LOAD MANAGEMENT SYSTEM, filed on Jun. 9, 2021 by Robert P. Madonna et al., which application is hereby incorporated by reference.

BACKGROUND

Technical Field

The present disclosure relates generally to the field of electric power and, more specifically, to a system and technique for flexibly managing electric power consumption of loads in a premises.

Background Information

Power system sources, such as generators and battery inverters, are often commercially locally deployed by customers or users of premises in a variety of types and sizes. The total power capacity of the local power source is likely less (smaller) than the amount of power (energy) that a premises, such as a home or place of business, may consume. Therefore, there is a need to ensure that the amount of power consumed by the premises is less than the amount of power available from the local power source.

Previous load management solutions available to premises with local or failover power sources typically include stations that are powered (turned-on) and arranged according to a pre-determined priority. However, as the capacity of the local power source becomes overwhelmed (oversubscribed), the load management system may begin terminating (shutting-off) power to the stations in reverse prioritized order, limiting flexibility during power shortages. A problem with such "static" load management is that branch circuits for the loads are hardwired to respective circuit breakers such that the load management prioritization of the loads is fixed for the premises, leaving the user bound to the configured prioritization.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a flexible load management (FLM) system and technique configured to adaptively monitor and manage power consumption of a premises. The FLM system and technique is configured to maintain such power consumption below a threshold relative to an amount of power available from a local power source, such as a generator or battery inverter. To that end, the FLM system includes a virtual critical load panel (vCLP) that utilizes circuit breakers in combination with companion modules (i.e., intelligent controllers) to vary a prioritization arrangement of loads by time of day, season or even dynamically. Illustratively, the vCLP is a prioritized enumeration (i.e., prioritization) of the loads within the premises, wherein the loads are considered sufficiently important such that they are protected by the local power source. Notably, the vCLP is dynamically configurable by a user in real time according to an instantaneous demand for the prioritized loads. That is, the instantaneous demand determines a number of branch circuits associated with loads able to be powered-on at any time. For example, if the circuits consume a relatively small amount of power, more of the circuits may be powered than if a smaller number of circuits consume a relatively large amount of power.

In an embodiment, the vCLP is a configuration of loads; the user may switch between vCLPs with knowledge of the loads that are powered (and not powered) according to the vCLP. However, if the user modifies a particular vCLP configuration during operation, a mobile application (e.g., executing on a mobile device) may issue a warning or notification that allows the user to decide whether to proceed with the modification. For example, assume a vCLP configured for a time of day (e.g., evening mode) prioritizes loads for services, such as cable television and entertainment services. As used herein, a service is a collection of components required to render (i.e., enable) the service (e.g., the cable television service may include a cable box, a television and an audio (surround-sound) system, which collectively are needed to render the service). Assume now that the user switches to a vCLP that prioritizes a laundry service, which includes components such as a washing machine and dryer. In response, the vCLP may transition the prioritized loads of the laundry service to the exclusion of the entertainment service, with or without a warning or notification to the user via the mobile application according to (i) time schedule (e.g., time of day, time of year), (ii) service/load class or type (e.g., profiled loads with a known maximum power consumption and dynamic loads without pre-determined power profiles), (iii) specific service/load, (iv) with warning and permission (e.g., the user is warned and has to give permission to deactivate/activate services and loads), and (v) without permission (e.g., the user may be warned, but the user cannot override activation of services and loads). Notably, applications of load consumption and corresponding activation/deactivation are organized according to the services as collections of loads, which may be grouped by entire branch circuit (e.g., a washing machine) and/or individual outlet (e.g., a television).

DESCRIPTION

Figure 1:
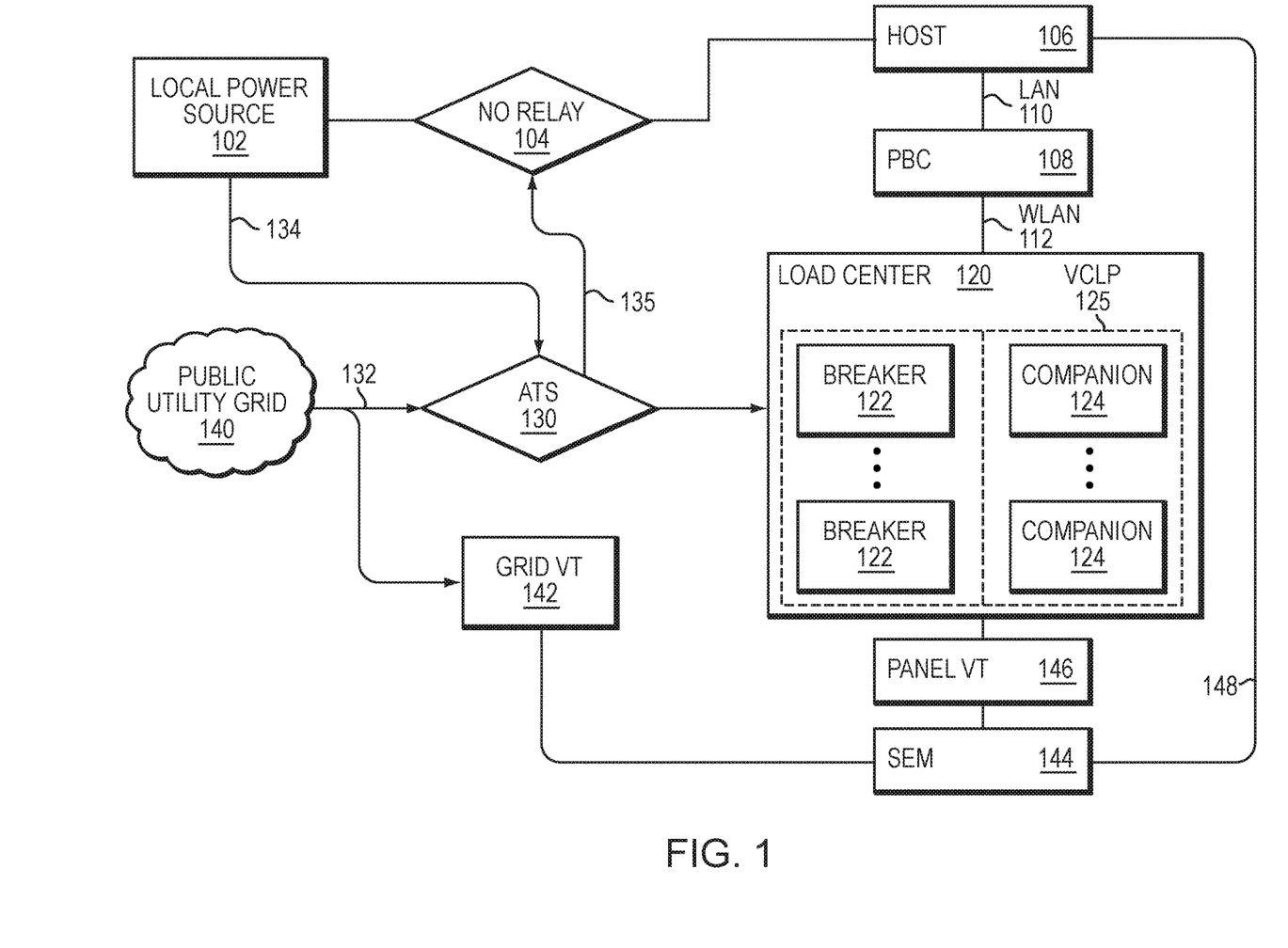
FIG. 1 illustrates an exemplary deployment of a flexible load management (FLM) system within an establishment.

FIG. 1 illustrates an exemplary deployment of a flexible load management (FLM) system 100 within a premises, such as a place of business or home. As described herein, the FLM system 100 employs one or more virtual critical load panel (vCLPs), each of which provides a prioritization of the loads that are considered sufficiently important to warrant protection by a local power source 102 of the premises as a failover and/or to supplement power availability. According to the technique described herein, the FLM system 100 utilizes circuit interrupts or breakers 122 in combination with companion modules 124 (i.e., intelligent controllers) to vary the prioritization of loads within the premises by time of day, season or even dynamically.

In one or more embodiments, the local power source 102 for the premises may be a generator or battery inverter, the latter of which converts direct current (DC) from a battery to alternating current (AC) of high voltage. Illustratively, the local power source 102 is configured to generate substantial power, e.g., in a range of 5 kilowatts (kW) to 30 kW, sufficient to power numerous and different types of loads. A normally-open (NO) relay 104 functions as an inhibitor to prevent the local power source 102 from turning-on unless and until the FLM system 100 is in a safe state, i.e., the number of connected companion modules is few enough to ensure that the power source will not overload when started. Note that use of the NO relay 104 may not be required if this latter condition is guaranteed.

A host 106 is configured to manage power consumption and/or other high-level control functions in the FLM 100, e.g., determining which loads shall be activated (powered). To that end, the host 106 may include a processor configured to execute software and manipulate data structures maintained in a memory (e.g., a persistent or volatile memory) having locations for storing the software and the data structures. The data structures may include a state center, which may utilize states of components/devices in the FLM system 100 to describe the configuration of the components/devices, as well as to maintain other types of information. The host 106 may also include interfaces containing mechanical, electrical and signaling circuitry needed to connect and communicate with those components/devices. In an embodiment, the host 106 may be implemented based on a host commercially available from Savant Systems, LLC.

A panel bridge controller (PBC) 108 connects to the host 106 via a local area network (LAN) 110, such as Ethernet. The PBC 108 is configured to convert commands received over the LAN 110 from the host 106 to messages provided to a load center 120 over a wireless LAN (WLAN) 112 in accordance with a wireless messaging protocol, such as Bluetooth. The commands received over the LAN 110 and WLAN 112 from the host 106 are configured to control the companion modules 124 of a load center 120.

The load center 120 may include one or more electrical panels that, during normal operation, is provided with, e.g., 200 ampere (amp) service from a public utility grid 140. In an embodiment, the load center 120 is configured to receive power over power feed 136 from the grid 140 via a main power feed 132 and an automatic transfer switch (ATS) 130, and distribute the power (i.e., current) to branch circuits of the premises via the circuit breaker 122 enclosed in the electrical panel. In accordance with FLM technique described herein, the electrical panel is embodied as a vCLP 125 by the inclusion of companion modules 124 hardwired (e.g., in series) with the circuit breakers 122 to control activation/deactivation of a respective circuit breaker. Illustratively, the companion modules 124 and associated circuit breakers 122 may be located in separate electrical boxes (e.g., a main electrical panel and a companion module panel) within the load center 120.

In an embodiment, the ATS 130 is an intelligent power switching device having a microprocessor-based controller configured to automatically disconnect from the main power feed 132 of the public utility grid 140 and connect to a local power feed 134 of the local power source 102 when power from the public utility grid 140 goes down (i.e., power fails or becomes unavailable). Illustratively, the ATS 130 includes a low voltage contact 135 in communication with the local power source 102 (e.g., via the NO relay 104) that is configured to initiate (trigger) starting of the local power source 102 in the absence of power from the public utility grid 140. Illustratively, the ATS 130 further includes a coil connected to the main power feed 132 that holds the contact 135 in a closed state when power is present on the main power feed 132. When power from the public utility grid 140 subsides (terminates), the coil de-energizes and opens the contact 135 to start the local power source 102. Power is then provided over the local power feed 134, through the ATS 130 and over the power feed 136 to the load center 120.

A grid voltage transformer (VT) 142 is configured to monitor the public utility grid voltage via a voltage monitoring branch circuit 138 to determine when the voltage sufficiently subsides (e.g., near a zero-crossing) so that it is safe to turn-on (activate) the local power source 102. In an embodiment, the grid VT 142 converts and isolates utility line voltage, e.g., 240V, to a low voltage suitable for digital sampling. A panel VT 146 is a voltage transformer configured to monitor voltage provided to the load center 120. In an embodiment, the FLM system 100 may also include one or more current transformers (CTs) configured to monitor current from the public utility grid 140 that is provided to the load center 120.

A smart energy monitor (SEM) 144 is configured to monitor (measure) the voltages and currents from the transformers, as well as from other loads (such as air conditioners) in the premises. Illustratively, the SEM 144 is embodied as an analog-to-digital (A-D) converter that collects and samples the voltages/currents from the VTs/CTs. The voltages and currents are preferably sampled at a high data rate (e.g., 1 kHz) by the SEM 144, which performs operations (i.e., computations) directed to, e.g., power factor, apparent/real power, etc., for power management calculations. The sampled data is then provided to the host 108 over control and data signal lines 148 to determine a power capacity level of the FLM system, in accordance with the FLM technique described herein.

Figure 2:
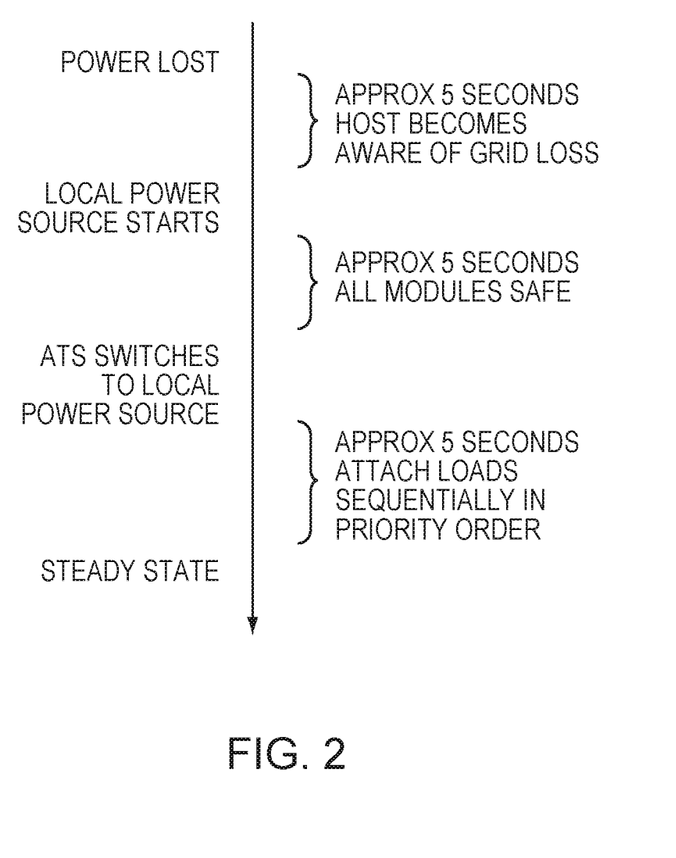
FIG. 2 is a timing diagram for a control path among various components of the FLM system.

FIG. 2 is a timing diagram for a control path 200 among the various components of the FLM system. In accordance with the technique, reliable performance of the FLM system 100 may be realized if the host 106 can detect and respond to the loss of power from the public utility grid 140 within a predetermined time interval, e.g., 5 seconds. Accordingly, the ATS 130 is configured to wait the time interval after detecting a loss of grid power before initiating activation of the local power source 102. During the time interval, the host 106 configures the companion modules 124 of the load center 120 to, e.g., serially connect (one at a time) loads to ensure that the local power source 102 does not overload, as well as to account for in-rush currents of loads on the branch circuits of the loads, i.e., to smooth or spread-out any in-rush current peaks over time.

Figure 3:
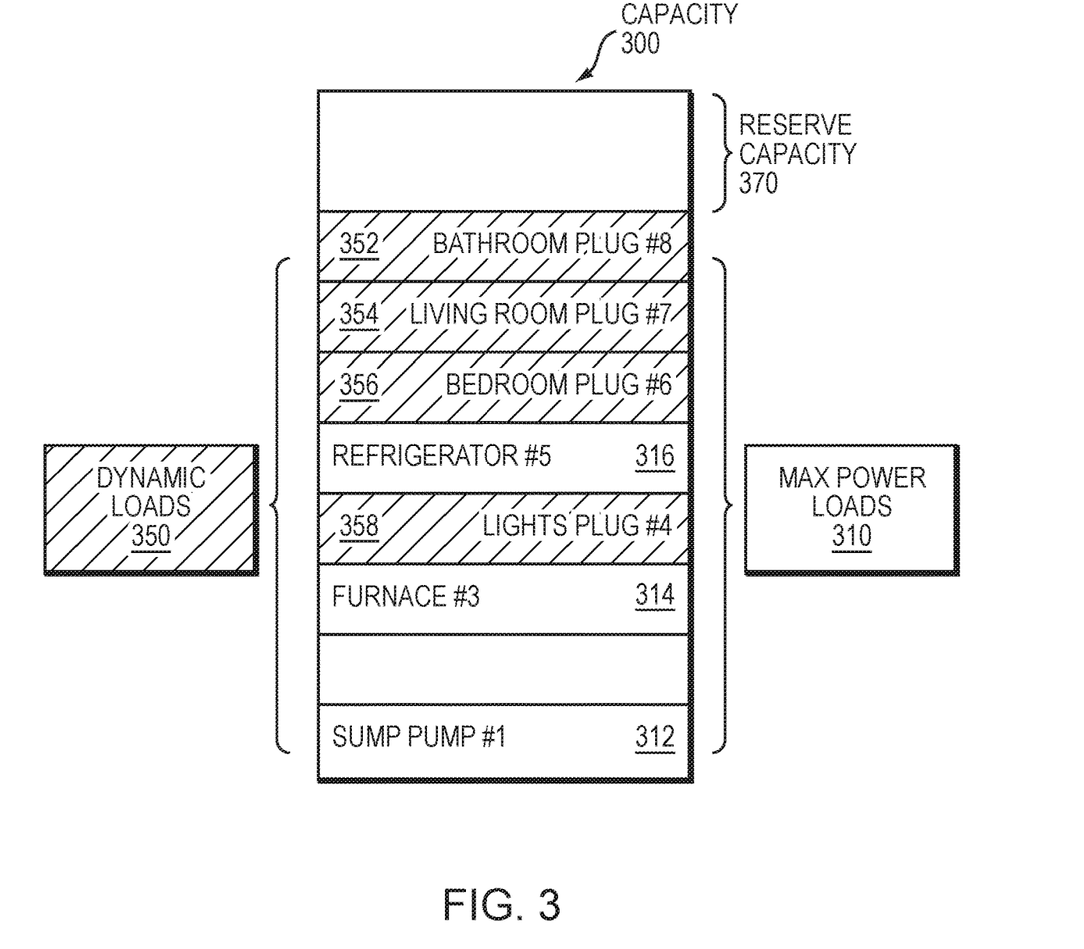
FIG. 3 is a block diagram illustrating a prioritization of loads within the FLM system.

FIG. 3 is a block diagram illustrating a prioritization of loads within the FLM system 100. In an embodiment, there are two types (i.e., classes) of loads in the FLM system: maximum (max) power loads 310 (i.e., having known power profiles or consumptions) and dynamic loads 350 (i.e., having unknown or unpredictable power profiles). The max power loads 310 are known quantities with respect to the maximum amount of power that such loads 310 can consume. Illustratively, the loads 310 may be major appliances, such as a sump pump, furnace, and refrigerator, wherein each load 310 is connected to a dedicated electrical outlet (i.e., a dedicated branch circuit of the load center), e.g., the sump pump is connected to dedicated plug 312, the furnace is connected to dedicated plug 314, and the refrigerator is connected to dedicated plug 316. The max power loads 310 are typically fixed loads within the premises, and their power consumption can be profiled and configured during installation of the FLM system since there is only a slight possibility that these loads may change. Moreover, these loads 310 may be considered critical to the operation and/or safety of the premises (i.e., "permanent critical loads") and, as such, are always powered.

In contrast, the dynamic loads 350 may change unpredictably and have unknown power profiles and, thus, have associated companion modules 124 configured to monitor and manage such load changes. Illustratively the dynamic loads 350 may include, e.g., hair dryer, phone charger, space heater, and lights, each of which may be connected to a regular plug, such as a bathroom plug 352, living room plug 354, bedroom plug 356, and lights plug 358 connected to branch circuits of the load center as monitored by the associated companion modules. The user may connect one or more of the loads 350 at any time and possibly overload a branch circuit corresponding to the regular plug by consuming more power than is supplied by, e.g., the local power source 102 to the premises. Although they may be considered important to the operation of the premises, the dynamic loads 350 are not generally considered critical to the safety of the premises and, thus, are subject to a prioritization arrangement that may result in their powering on and off, as described herein.

Illustratively, the FLM system 100 is configured to account for the two different types of loads within the overall system power capacity 300 for the premises, while ensuring that, through such accounting, the system allows for reserve power capacity 370. As used herein, reserve capacity 370 is extra power capacity that is reserved in the event that the user electrically connects a dynamic load 350 that consumes substantial power of the system capacity 300, but does not cutoff (i.e., trip) the flow of electricity to a circuit breaker 122. In essence, the reserve capacity allows for a margin of unpredictable power consumption of unprofiled loads. The FLM system 100 constantly monitors and manages the loads that are powered on (and off) to ensure that a reserve capacity constraint is maintained.

In an embodiment, the reserve capacity constraint may be determined (e.g., calculated) as a percentage of reserve capacity 370 to overall system power capacity 300, e.g., at least 5% or approximately 2 kW, based on a reserve threshold. For example, assume a 20 amp circuit breaker 122 rated at a nominal 120V may be able to service approximately 2 kW of power and this is desired as a reserve capacity expressed as a threshold. Thus, for a 200 amp service panel at 120V (providing about 24 kW) the reserve capacity expressed as a percentage based on the reserve threshold of 2 kW would be 8.3% (2 kW/24 kW). Since a typical hair dryer (dynamic load 350) may consume 2 kW, the reserve capacity 370 of 2 kW should be sufficient to accommodate a user inserting and using the hair dryer via a bathroom plug 356 and not overload the local power source 102. However, it should be noted that in other embodiments, the reserve capacity constraint may increase to as much as 30%, particularly for FLM systems having older (and less precise) modules, controllers and/or monitors with less capability to measure unpredictable power consumption.

In accordance with the technique, flexible load management may be implemented by rules prioritizing the loads through an ordered enumeration of prioritization of the plugs connected to the loads (e.g., from highest to lowest priority). For example, dedicated plug 312 (connected to the sump pump) may be enumerated as the highest priority #1, with the dedicated plug 314 (connected to the furnace) enumerated as priority #3 and the dedicated plug 316 (connected to the refrigerator) enumerated as priority #5. In addition, the lights plug 358 may be enumerated as priority #4, followed by the bedroom plug 356 enumerated as priority #6, the living room plug 354 enumerated as priority #7, and bathroom plug 352 enumerated as the lowest priority #8.

Dynamic loads, on the other hand, may be managed as a power pool with load activation/deactivation based on priority. For example, assume that a user inserts a dynamic load (such as a space heater) into the bedroom plug 356 (priority #6) and the power consumed by that load substantially increases, e.g., by a 1 kW. Upon detection of the increased power consumption, the host 106 may begin instructing one or more companion modules 124 to begin shutting off power to loads connected to lower priority plugs, such as bathroom plug 352 (priority #8) and, if needed, living room plug 354 (priority #7). Notably, the FLM technique may continue to terminate power to loads connected to lower priority plugs until the reserved capacity constraint is restored. Alternatively, the load causing the increased consumption may be deactivated based on priority. For example, assume that the user inserts the space heater into the bathroom plug 352 (priority #8) and power consumed by the dynamic load impinges into the reserve capacity 370. According to the technique, the host 106 may instruct the companion module 124 associated with the plug 352 to shut-off power to the associated branch circuit.

In accordance with the FLM technique, the host 106 may configure the overall system capacity 300 by distributing the reserve capacity 370 among the powered loads (i.e., respective plugs) and instruct the companion modules 124 to shut-down power to their associated branch circuits if the power consumed by the dynamic loads 350 increases by a predefined amount. That is, power management may, in part, be performed according to relative power consumption increase per branch circuit rather than exclusively by power consumption increase for the pool of dynamic loads as a whole. Certain power management functions (e.g., short duration power spikes) may be distributed to the companion modules to operate per branch circuit in real-time. In this manner, the distributed configuration ensures protection and preservation of the reserve capacity 370 in the event of unexpected high-power peaks or limited remaining reserve capacity. Further, by offloading such load management to the companion modules 124, the FLM system 100 may respond to sudden changes in the dynamic loads in very short (fast) time, e.g., milliseconds. In contrast, a centralized configuration of load management may require, e.g., a power measurement by the companion modules, communication of the measurement to the host, rendering of a decision by the host, and transmission of the decision to the companion modules, which may substantially increase the response time (e.g., 1-2 seconds) due to sudden load changes. As such, power management for load activation/deactivation may be triggered (effected) by either the host 106 or the companion modules 124 under direction of the host, wherein the distributed mode of operation may occur in response to a decreased reserve power capacity when dynamic load increases.

Figure 4:
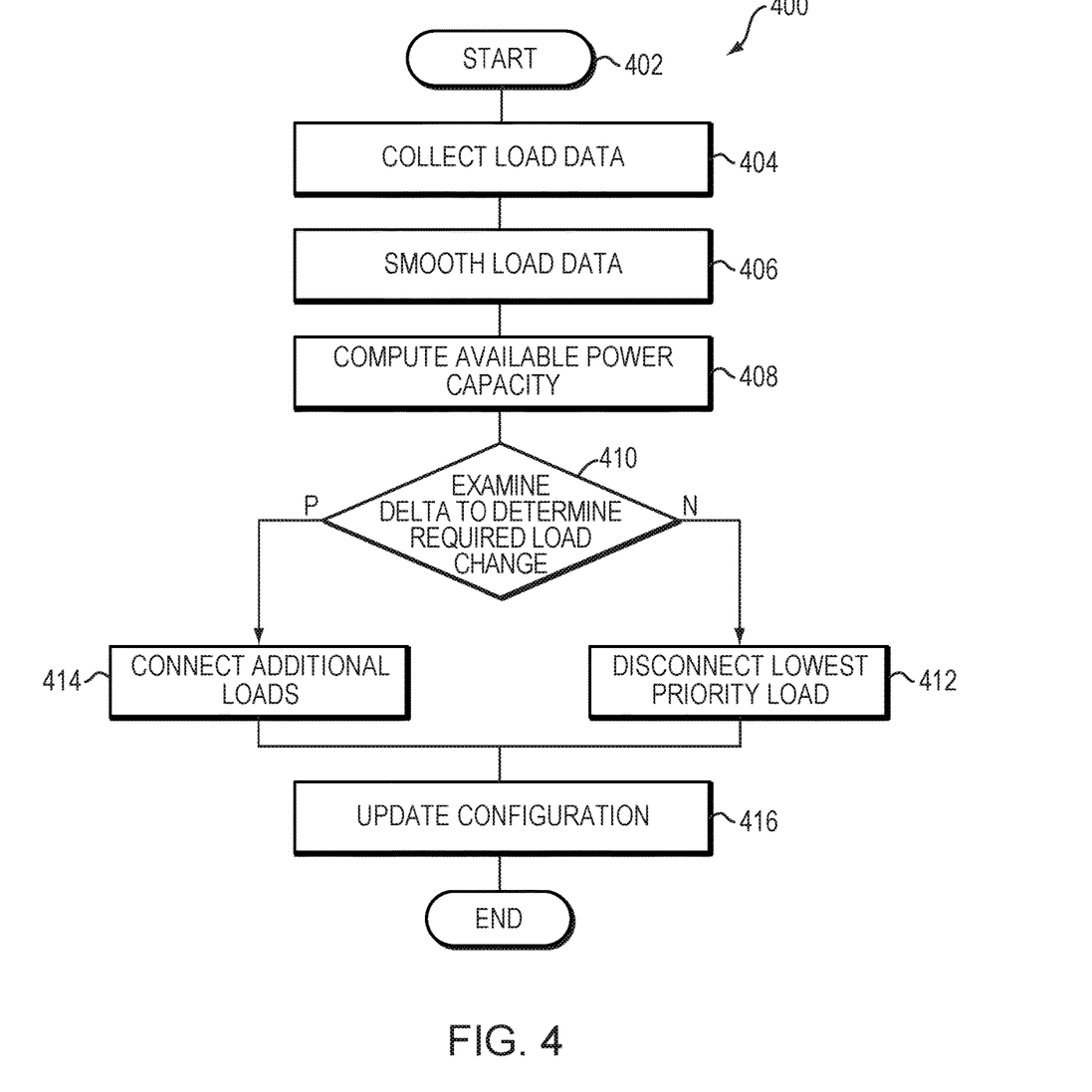
FIG. 4 is a simplified procedure for implementing the prioritization of loads within the FLM system.

FIG. 4 is a simplified procedure for implementing the prioritization of loads within the FLM system. In an embodiment, the host 106 may implement the procedure 400 by executing software in connection with a data structure (i.e., a state center) to provide configurations for the companion modules 124 and other components of the FLM system 100. The procedure 400 starts at box 402 and proceeds to box 404 where power readings and states of components (i.e., load data) are collected by the SEM 144 and organized as information of the state center. At box 406, the host 106 processes the load data in accordance with a power smoothing algorithm of the software to smooth values of the load data. The resulting smoothed data values ensure that the states of the loads do not change excessively and prevent the maximum power loads from appearing as though they are turning on-and-off as they operate. At box 408, the host 106 processes the smoothed data to compute the current available power capacity of the FLM system. Illustratively, such processing involves subtracting the smoothed load data values from the system capacity 300 of the local power source 102 and comparing the result (i.e., delta) to the reserve capacity 370.

At decision box 410, a determination is rendered as to whether a change in load state is required by examining the delta. For example, if the delta is negative (indicating a shortage of reserve capacity), then the lowest priority load is disconnected at box 412. Alternatively, if the delta is positive (indicating an excess of reserve capacity), the additional loads may be connected at box 414. At box 416, the host 106 transmits the processed states as updated configurations to the companion modules 124. Illustratively, the host 106 constantly computes the states (data) monitored and provided by the SEM 144 to provide new, updated configurations to the companion modules based on the computed data, typically at a rate of every second (e.g., 1 Hz frequency). The computations are manifested as changes in reserve capacity 370, which results in rebalancing of the configurations for the companion modules every second. The procedure then ends at box 418.

In an embodiment, there may be multiple PBCs in the FLM system 100, wherein each PBC 108 functions as a coordinator of a number of companion modules 124. Each PBC may manage a limited number of companion modules (e.g., 80 modules); for a premises with more than the limited number of modules, another PBC may be required for the FLM system 100. Note that the companion module limit may be constrained by communication such as the wireless protocol (e.g., Bluetooth) as to a defined number of physical devices per antenna. The reserve capacity computations are synchronized among the PBCs so that they are provided with the same, updated reserve capacity constraint.

Figure 5:
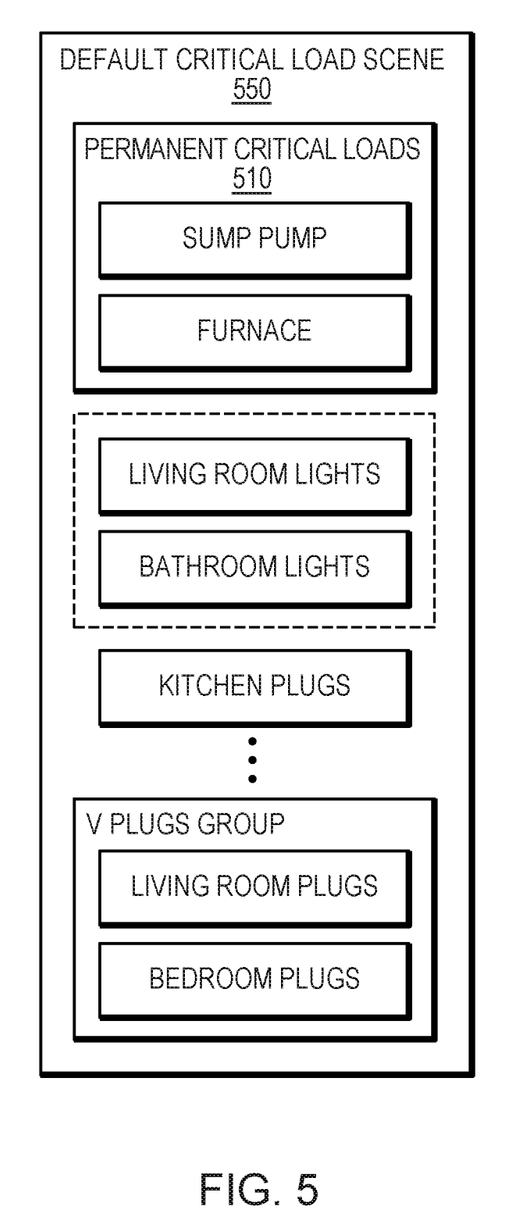
FIG. 5 illustrates a wireframe for presenting the prioritization of the loads.

FIG. 5 illustrates a wireframe for presenting the prioritization of the loads to a user. The wireframe 500 is particularly useful for a premises having a substantial number (e.g., 200-300) of loads and a plurality of vCLPs 125. As used herein, the vCLP is a prioritized enumeration (i.e., prioritization) of the loads within a premises, wherein the loads are considered sufficiently important such that they are protected by the power system. Notably, the vCLP is dynamically configurable by the user in real time according to an instantaneous demand for the prioritized loads. A critical load scene includes a vCLP configuration of devices/components that have associated companion modules, whereas a scene further includes devices/components (such as thermostats) that do not have associated companion modules. Illustratively, a scene defines states of the devices/components of the premises, whereas a critical load scene defines states (e.g., on/off) of the companion modules of the vCLP in the premises. Essentially, the critical load scene is directed to companion modules associated with critical loads whereas the scene is directed to all loads with or without the companion modules.

In one or more embodiments, a critical load scene is generated and processed by a (home) automation system of a host, whereas a vCLP is generated and processed by companion modules and/or controllers that generally do not interact and communicate with other components of the premises. In other words, the companion modules and controllers are virtually wired (and commanded) to turn on and off (activate/deactivate) based on prioritization. Notably, the companion modules of the vCLP may be configured by a user via a mobile application executing on a mobile device. However, if the user modifies a particular vCLP configuration during operation, the mobile application may issue a warning or notification that allows the user to decide whether to proceed with the modification.

Illustratively, the wireframe 500 illustrates logical groupings (and sorting) of the vCLP loads as a default critical load scene 550 that manifests as a prioritization arrangement of loads (i.e., dynamic loads 350) and which are subject to powering on and off together as necessary. A subset of scene 550 includes permanent critical loads 510 (i.e., max power loads 310) that are exclusive of the arrangement. In an embodiment, the FLM system 100 may heuristically group and automatically arrange the logical groupings of the vCLP loads as a prioritization listing of loads for presentation to a user via a user interface (UI) of, e.g., the mobile device. The user may be allowed to re-prioritize the loads by overriding the vCLP configuration through interaction with the host 106 via the mobile application.

Advantageously, the FLM system and technique described herein allows monitoring and management of power consumption of a premises in a flexible (adaptive) manner. To that end, the FLM system employs one or more vCLPs that utilize circuit breakers in combination with companion modules (i.e., intelligent controllers) to vary a prioritization arrangement of loads by time of day, season or even dynamically. The companion modules of the vCLP enable low-variable latency for substantial changes to power consumed in the premises by allowing the host to distribute the intelligence of load management among the modules and their associated circuit breakers as to when to shut-off power to loads, such as dynamic loads. The FLM technique may configure the companion modules with parameters (e.g., ranges) of power consumption such that if the range is exceeded, the modules shut down power to the loads via the associated circuit breakers. Notably, each companion module may incorporate "soft trip" functionality that, in response to detecting power exceeding a range of limit parameters for a load, disconnects power, e.g., via a relay. The vCLP is dynamically configurable by a user in real time according to an instantaneous demand for the prioritized loads that is used to determine a number of branch circuits associated with the loads that are able to be powered-on at any time. That is, if the circuits consume a relatively small amount of power, more of the circuits may be powered than if a smaller number of circuits consume a relatively large amount of power.

While there have been shown and described illustrative embodiments of a flexible load management (FLM) system and technique configured to adaptively monitor and manage power consumption of a premises, it is to be understood that various other adaptations and modifications may be made within the spirit and scope of the embodiments herein. For example, embodiments have been shown and described herein with relation to maintaining such power consumption below a threshold relative to an amount of power available from a local power source. The FLM system includes one or more vCLPs that utilize companion modules to vary a prioritization arrangement of loads by time of day, time of year (e.g., season) or even dynamically. However, the embodiments in their broader sense are not so limited, and may, in fact, allow for implementation of a "service power sources" feature of the FLM system that configures a UI of the (home) automation system based on devices that are powered within the premises. Yet, when the FLM system is combined with the home automation system, a problem may arise with regards to tracking and automatically powering components (and associated branch circuits) for services requested by a user.

For example, a cable television service may include a plurality of components, such as a cable box, television and audio (surround-sound) system, that are located on different branch circuits but that collectively provide the service. In order to activate the service (i.e., turn-on all of the components), all of the branch circuits need to be identified and activated prior to powering on of the components. Notably, applications of load consumption and corresponding activation/deactivation are organized according to the services as collections of loads, which may be grouped by entire branch circuit (e.g., a washing machine) and/or individual outlet (e.g., a television). As such, the FLM system may be employed to map the cable television service to the branch circuits so as to ensure activation of the circuits before service activation. Here, the FLM system may leverage scenes and services, including branch circuit dependencies of the services, to activate companion modules of the vCLP in order to provide the services. In an embodiment, the services and mappings may constitute a host-based "service power sources" configuration that is organized as a hierarchical dependency mapping wherein a scene maps to a service, and the service maps to one or more companion modules and their associated branch circuits.

In an embodiment, the vCLP may transition the prioritized loads with or without a warning or notification to the user via the mobile application according to (i) time schedule (e.g., time of day, time of year), (ii) service/load class or type (e.g., profiled loads with a known maximum power consumption and dynamic loads without pre-determined power profiles), (iii) specific service/load, (iv) with warning and permission (e.g., the user is warned and has to give permission to deactivate/activate services and loads), and (v) without permission (e.g., the user may be warned, but the user cannot override activation of services and loads). For example, daily at 9 PM, laundry service has priority over entertainment services but with a warning and requiring user permission; yet in January, any heating service (e.g., all furnaces on the premises) may be activated without permission (e.g., a warning may be issued, but the user may not override the furnace service so that some current loads may be turned off to satisfy heating service demands).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or compact disks) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    sampling current from one or more branch circuits connected to an electrical panel, wherein each branch circuit is coupled to an associated sensor and wherein a respective switch controls power to a load on a respective branch circuit;
    calculating load data of the branch circuits based on the current samples;
    determining a reserve capacity as a percentage of a system capacity of power to the electrical panel based on a reserve threshold of power;
    computing an available power capacity by subtracting the load data from the system capacity; and
    updating a first group of loads to deactivate the respective switch in response to the available power capacity falling below the reserve capacity from an increase in the load on the respective branch circuit.

2. The method of claim 1 further comprising updating a second group of loads to deactivate, wherein the second group of loads have a lower priority than the first group of loads.

3. The method of claim 2 wherein loads on respective branch circuits of the second group of loads have pre-determined power profiles with known maximum power consumption.

4. The method of claim 2 wherein loads on respective branch circuits of the second group of loads are without pre-determined power profiles.

5. The method of claim 1 further comprising updating a second group of loads to activate switches coupled to respective branch circuits of the second group of loads in response to the available power capacity increasing above the reserve capacity.

6. The method of claim 1 further comprising updating a second group of loads to maintain activation switches coupled to respective branch circuits of the second group of loads in response to the available power capacity falling below the reserve capacity, wherein the second group of loads have a higher priority than the first group of loads.

7. The method of claim 1 wherein updating the first group of loads occurs at least once a second.

8. The method of claim 1 further comprising:
    heuristically arranging loads on respective branch circuits into logical groupings as a prioritized listing of the loads for presentation to a user via a user interface (UI).

9. The method of claim 1 further comprising smoothing the load data prior to computing the available power capacity.

10. The method of claim 1 wherein the determined reserve capacity is at least 5 percent of the system capacity.

11. An apparatus comprising:
    an energy monitor having a processor coupled to one or more modules, each module having a sensor for sampling a current of a branch circuit of an electrical panel, wherein each module includes a respective switch to control power to a load on a respective branch circuit, the processor configured to,
        calculate load data of the branch circuits based on collected current samples of the branch circuits;
        determine a reserve capacity as a percentage of a system capacity of power to the electrical panel based on a reserve threshold of power;

compute an available power capacity by subtracting the load data from the system capacity; and update a first group of loads to deactivate the respective switch in response to the available power capacity falling below the reserve capacity from an increase in the load on the respective branch circuit.

12. The apparatus of claim 11, wherein the processor is further configured to update a second group of loads to deactivate, wherein the second group of loads have a lower priority than the first group of loads.

13. The apparatus of claim 12 wherein loads on respective branch circuits of the second group of loads have pre-determined power profiles with known maximum power consumption.

14. The apparatus of claim 12 wherein loads on respective branch circuits of the second group of loads are without pre-determined power profiles.

15. The apparatus of claim 11 wherein the processor is further configured to update a second group of loads to activate switches coupled to respective branch circuits of the second group of loads in response to the available power capacity increasing above the reserve capacity.

16. The apparatus of claim 11 wherein the processor is further configured to update a second group of modules to maintain activation of switches coupled to respective branch circuits of the second group of modules in response to the available power capacity falling below the reserve capacity, wherein the second group of modules have a higher priority than the first group of modules.

17. The apparatus of claim 11 wherein updating the first group of modules occurs at least once a second.

18. The apparatus of claim 11 wherein the processor is further configured to heuristically arrange loads on respective branch circuits into logical groupings as a prioritized listing of the loads for presentation to a user via a user interface (UI).

19. The apparatus of claim 11 further comprising smoothing the load data prior to computing the available power capacity.

20. A non-transitory computer readable medium having program instructions configured for execution on a processor, the program instructions configured to:

collect load data from one or more branch circuits connected to an electrical panel by sampling a current in each branch circuit coupled to a respective switch controlling power to a load on a respective branch circuit;

determine a reserve capacity as a percentage of a system capacity of power to the electrical panel based on a reserve threshold of power;

compute an available power capacity by subtracting the load data from the system capacity; and update a first group of loads to deactivate the respective switch in response to the available power capacity falling below the reserve capacity from an increase in the load on the respective branch circuit.

* * * * *